(12) United States Patent
Kohda et al.

(10) Patent No.: US 9,054,914 B2
(45) Date of Patent: Jun. 9, 2015

(54) TRANSMITTING DEVICE, RECEIVING DEVICE, CIRCUIT DEVICE, COMMUNICATION METHOD AND PROGRAM

(71) Applicant: International Business Machines Corporation, Armonk, NY (US)

(72) Inventors: Yasuteru Kohda, Kanagawa-ken (JP); Kohji Takano, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/197,350

(22) Filed: Mar. 5, 2014

(65) Prior Publication Data

US 2014/0294051 A1 Oct. 2, 2014

(30) Foreign Application Priority Data

Mar. 7, 2013 (JP) .................................. 2013-044998

(51) Int. Cl.
*H04B 3/46* (2006.01)
*H04L 25/06* (2006.01)

(52) U.S. Cl.
CPC .................................... *H04L 25/063* (2013.01)

(58) Field of Classification Search
None
See application file for complete search history.

(56) References Cited

U.S. PATENT DOCUMENTS

| 6,466,626 | B1 * | 10/2002 | Cecchi et al. ................. 375/257 |
| 2008/0309158 | A1 * | 12/2008 | Schierling ........................ 307/3 |
| 2011/0150057 | A1 * | 6/2011 | Anschutz et al. ............. 375/222 |

* cited by examiner

*Primary Examiner* — Adolf Dsouza
(74) *Attorney, Agent, or Firm* — Jeff Tang (57) ABSTRACT

A transmitting device, a receiving device, a circuit device, and a communication method and program. The transmitting device including: a model storage unit for storing a change model for a reference level of a signal on the receiving device end due to coupling between the transmitting device and a receiving device; a compensation calculating unit for calculating a compensation value for offsetting a change in the reference level of the signal constituting a symbol sequence; and an output waveform changing unit for changing an output waveform of the signal constituting the symbol sequence on the basis of the compensation value for the change in the reference level.

15 Claims, 9 Drawing Sheets

Baseband signal waveform before correction

FIG. 8B

Compensation value

FIG. 8C

Baseband signal waveform after correction

FIG. 8D

Baseband signal waveform observed at the received end

TRANSMITTING DEVICE, RECEIVING DEVICE, CIRCUIT DEVICE, COMMUNICATION METHOD AND PROGRAM

CROSS-REFERENCE TO RELATED APPLICATION

This application claims priority under 35 U.S.C. §119 from Japanese Patent Application No. 2013-044998 filed Mar. 7, 2013, the entire contents of which are incorporated herein by reference.

BACKGROUND OF THE INVENTION

1. Field of the Invention

The present invention relates to a transmitting device, a receiving device, a circuit device, a communication method, and a program. The present invention relates more specifically, to a transmitting device in which coupling is present between the transmitting device and a receiving device with which it is capable of communicating, a receiving device, a circuit device, a communication method executed by the transmitting device and the receiving device, and a computer program product able to realize the transmitting device.

2. Description of the Related Art

There are growing demands for higher speed wireless communication in order to send and receive rich content such as movies in real time, and realize seamless connections with wired communication. In order to realize such high-speed, high-capacity data communication, there are great expectations for millimeter-wave wireless communication techniques which are able to realize high-speed wireless communication at a data rate on the order of gigabytes per second.

Wireless communication devices typically include a digital processing unit (baseband) responsible for digital signal processing, and an analog processing unit (RF: radio frequency) responsible for analog signal processing. These processing units are connected to each other using alternating-current coupling (capacitive coupling) in order to absorb the difference in input/output bias voltage and realize stable operation.

Alternating-current coupling requires a direct-current balance, and accurate data transmission is difficult when there is a large number of direct-current components and low-frequency components. Because the bit bias in transmitted signals causes direct-current offset components, a scrambler and a data encoding technique are typically used to perform pre-processing which sufficiently diffuses the transmitted bits and eliminates the bias.

In the data encoding technique, additional bits are inserted at the expense of reducing the encoding efficiency. A scrambler used alone seems at first to have uniformly dispersed the bits, but a bias sometimes occurs as a result of the scrambling. In other words, it is possible to continuously generate the same bit over a short period of time using a scrambler, but a bit bias occurs stochastically. Direct-current offset components occur during this short period of time, and this causes the error rate to deteriorate.

If binary digital signals are being handled, this can not be a problem even when there are direct-current offset components. However, because high-speed communication techniques such as millimeter-wave communication has such a high data rate, a modulation scheme that modulates the amplitude such as 16QAM is employed, and the effect of direct-current offset components on multilevel decisions in the direction of the amplitude cannot be ignored. When the signal decision boundary is even finer, such as 64QAM, the effect of direct-current offset components is significant.

Many techniques used to compensate for direct-current offsets in wireless communication are known. Examples include Japanese Translation of PCT Application No. 2011-507408 (Patent Literature 1), Japanese Translation of PCT Application No. 2009-510948 (Patent Literature 2), Japanese Patent No. 4,195,193 (Patent Literature 3), and Japanese Laid-open Patent Publication No. 2006-86768 (Patent Literature 4). Patent Literature 1 through Patent Literature 4 relate to techniques which compensate for direct-current offsets on the receiving end. A technique has been disclosed in Japanese Laid-open Patent Publication No. 2010-45596 (Patent Literature 5) which corrects for carrier leakage that occurs in the quadrature modulation unit of a wireless communication device.

Various techniques used to compensate for direct-current offsets are known, and Patent Literature 1 through Patent Literature 4 are signal correcting techniques employed by a receiver. At the high data rates of millimeter-wave wireless communication, the overhead is too high to realize sufficient direct-current offset correction using signal correction processing on the receiving end. Patent Literature 2 and Patent Literature 3 address DC offsets due to local oscillator leakage and circuit imbalances. The technique disclosed in Patent Literature 5 addresses DC offsets due to carrier leakage in an IQ mixer. These techniques do not solve the problem of direct-current offsets due to leakage in alternating-current coupling described above.

Therefore, the development of a technique is desired which allows a transmitting device to rapidly compensate for short-term direct-current offsets and low-frequency components caused by the alternating-current coupling described above.

BRIEF SUMMARY OF THE INVENTION

The present invention provides a transmitting device, capable of communicating with a receiving device, including: a model storage unit for storing a change model for a reference level of a signal on a receiving device end due to coupling between the transmitting device and the receiving device with which it is communicating; a compensation calculating unit for calculating a compensation value for offsetting a change in the reference level of the signal constituting a symbol sequence on the receiving device end; and an output waveform changing unit for changing an output waveform of the signal constituting the symbol sequence on a basis of the compensation value of the change in the reference level.

The present invention also provides a receiving device capable of communicating with a transmitting device, the receiving device includes: a receiving unit for receiving, from a transmitting device, a test signal that has received a change in a signal level due to coupling present between the transmitting device and a receiving device; a transmitting unit for transmitting to the transmitting device a measurement result of a change in the test signal observed on the receiving device end; and the receiving unit receiving a signal constituting a symbol sequence from the transmitting device, and compensates for the change in a reference level of a received signal on a basis of a measurement result for the change.

In addition, the present invention provides a circuit device for generating a signal to output to a subsequent stage via a coupling element, and the circuit device includes: a model storage unit for storing a change model for a reference level of a signal due at least to coupling by a coupling element; a calculating unit for calculating a compensation value for offsetting a change in the reference level of a signal having a plurality of signal levels on the basis of the change model; and an output waveform changing unit for changing the output waveform to a subsequent stage of the signal having the plurality of signal levels on the basis of the compensation value for the change in the reference level.

The present invention further provides a communication method executed by a receiving device and a transmitting device, the communication method includes: a transmitting device reading a change model for a reference level of a signal at the receiving device end due to coupling present between the transmitting device and the receiving device; and the transmitting device transmitting a signal constituting a symbol sequence to the receiving device; wherein transmitting the signal further includes: calculating, on the basis of the change model, a compensation value for the signal constituting the symbol sequence to offset a change in the reference level at the receiving device end; and transmitting device changing, on the basis of the compensation value for the change in the reference level, an output waveform of the signal constituting the symbol sequence.

BRIEF DESCRIPTION OF THE DRAWINGS

FIG. 4 is a diagram used to explain and illustrate the change model forming process performed by the change model forming unit according to embodiments of the present invention. More specifically:

FIG. 8 is a diagram used to explain, along with the signal waveform, a correction process based on changes to the output waveform of the baseband signals on the transmitting end, according to embodiments of the present invention. More specifically:

FIG. 9 is a graph showing the measured waveform of the baseband signals observed by the millimeter-wave wireless communication device on the receiving end according to an embodiment of the present invention. More specifically:

DETAILED DESCRIPTION OF THE PREFERRED EMBODIMENTS

In view of the technical problem described above, it is an object of the present invention to provide a transmitting device, a receiving device, a circuit device, a communication method, and a computer program product able to rapidly compensate for any change in the reference level due to coupling which is observed at the receiving device end.

The configuration of the present invention enables any change in the reference level due to coupling which is observed by the receiving device to be compensated for by the transmitting device at high speed.

The following is an explanation of a specific embodiment of the present invention. The present invention is not limited to the embodiment explained below. In the embodiment explained below, wireless communication device 110 is an example of a transmitting device, and the wireless communication system 100 including wireless communication device 110 is an example of a transmitting device including a transmitting device.

Figure 1:
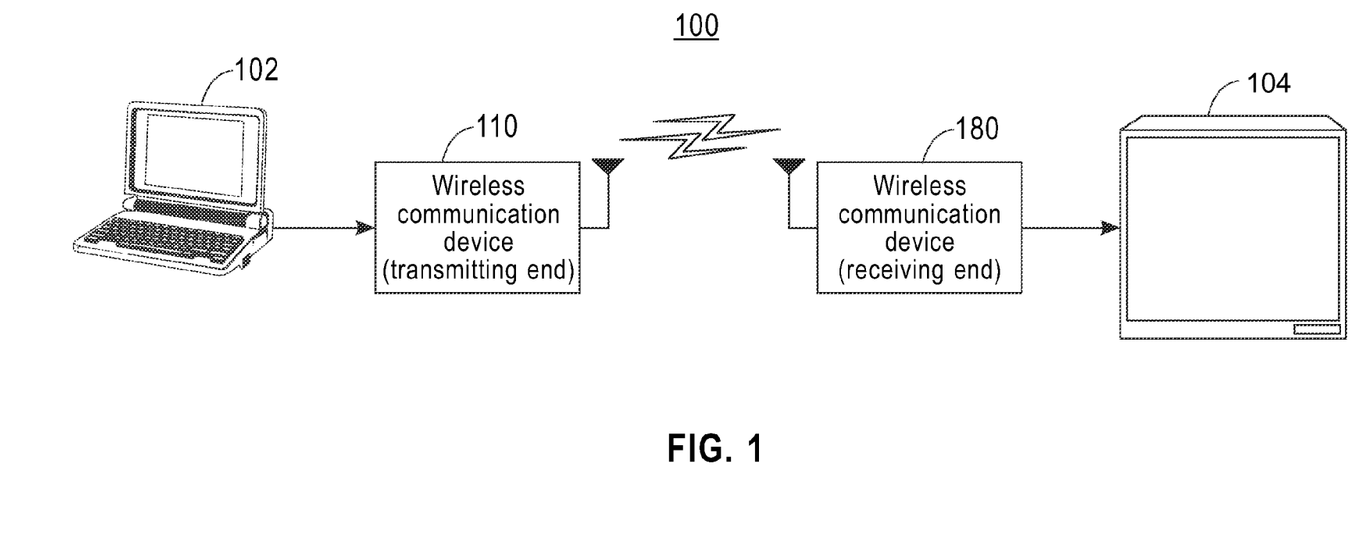
FIG. 1 is a schematic diagram showing a wireless communication system according to an embodiment of the present invention.

FIG. 1 is a schematic diagram showing a wireless communication system 100 according to an embodiment of the present invention. The wireless communication system 100 in the present embodiment includes a first wireless communication device 110 and a second wireless communication device 180. Wireless communication devices 110 and 180 establish wireless communication using electromagnetic waves in the double-digit GHz frequency band (millimeter waves), and have attained double-digit Gbps data communication rates.

Wireless communication devices 110 and 180 can perform data communication with each other in situations in which either one is the transmitter or receiver. However, in the following explanation, the first wireless communication device 110 is on the transmitting end and the second wireless communication device 180 is on the receiving end.

Wireless communication device 110 tunes the data to be transmitted in frames, and transmits the data to the wireless communication device 180 on the other end. In the example illustrated in FIG. 1, a notebook-type personal computer 102 is connected to wireless communication device 110, and a display device 104 is connected to wireless communication device 180. In the illustrated embodiment, the wireless communication device 110 tunes content data such as a movie inputted from the notebook-type personal computer 102 to frames in a payload unit, and sends the data to wireless communication device 180. Wireless communication device 180 acquires the content data from the frames, and displays the content on the screen of the display device 104.

Figure 2:
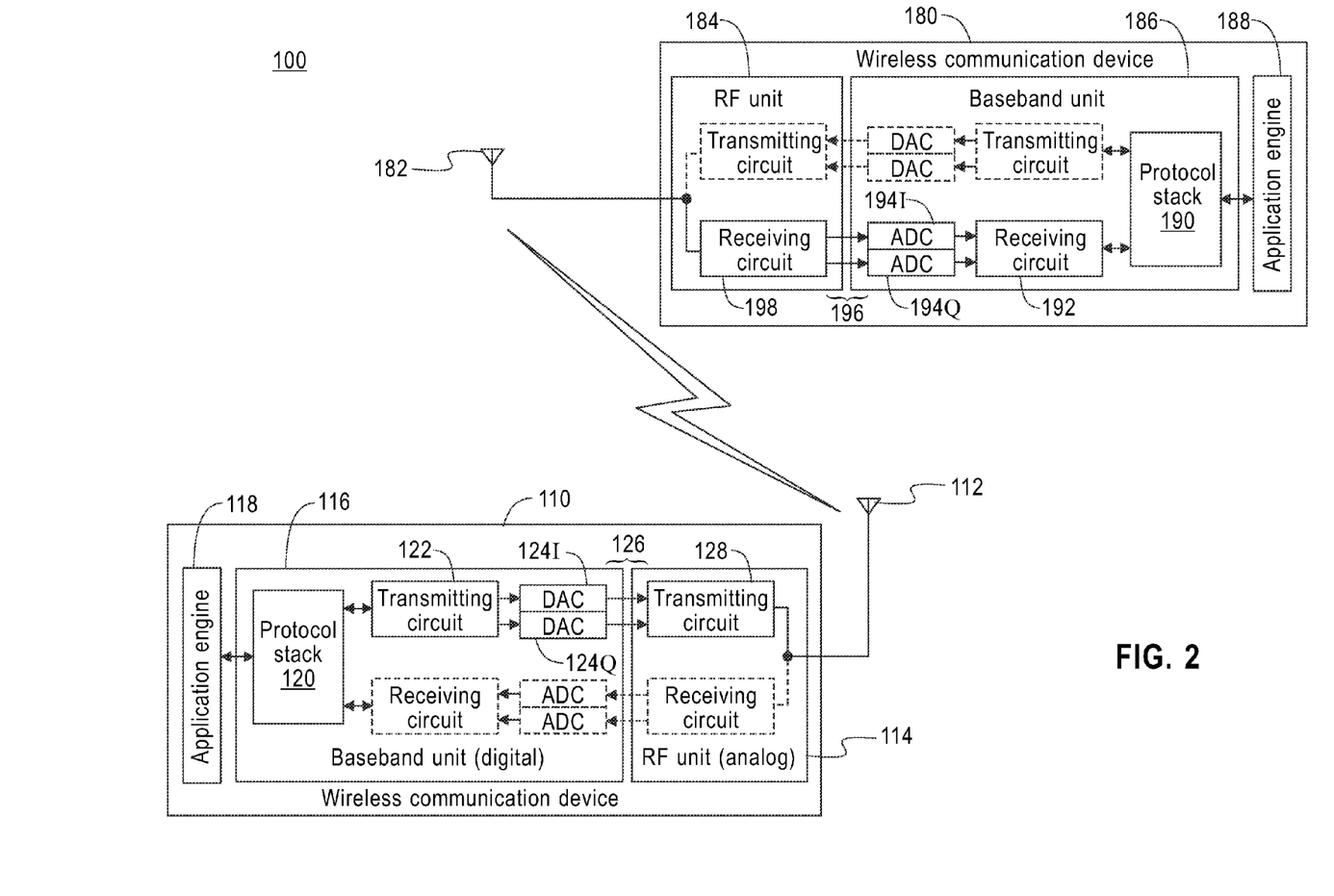
FIG. 2 is a block diagram showing the function configuration of the wireless communication devices in the wireless communication system according to an embodiment of the present invention.

FIG. 2 is a block diagram showing the function configuration of wireless communication devices 110 and 180 in the wireless communication system 100 according to an embodiment of the present invention. Wireless communication device 110, shown in FIG. 2, includes an antenna 112, a radio frequency (RF) unit 114 responsible for analog processing, a baseband unit 116 responsible for digital processing, and an application engine 118 for a subsequent stage. Wireless communication device 180 includes a similar antenna 182, RF unit 184, baseband unit 186, and application engine 188.

During reception, antennas 112 and 182 receive electromagnetic waves propagating through space, convert the electromagnetic waves into electrical signals, and input the electrical signals to RF units 114 and 184. During transmission, antennas 112 and 182 convert electrical signals inputted from RF units 114 and 184 into electromagnetic waves, and emit the electromagnetic waves in space.

RF units 114 and 184 are circuit blocks used to process signals in the frequency band of the electromagnetic waves serving as the carriers. RF units 114 and 184 include a transmitting circuit 128 and a receiving circuit 198. During transmission, the inputted baseband signals are modulated to signals in the RF frequency band. During reception, signals in the RF frequency band are demodulated to baseband signals. In FIG. 2, numbers are assigned to the components in wireless communication device 110 along the transmission route. Numbers are not assigned to components that are not along the transmission route. These components are also denoted by dotted lines. In wireless communication device 180 the opposite is true. Numbers are not assigned to components that are not along the reception route, and these components are denoted by dotted lines.

When the signals before modulation or after demodulation are binary signals, the baseband signals correspond to square waves having signal levels expressing "0" and "1". When the signals are multi-level signals, the baseband signals correspond to rectangular signal waves having a plurality of signal levels expressing each value. RF units 114 and 184 perform modulation by multiplying the carriers by the baseband signals. In the present explanation, the baseband signals are treated as having a rectangular shape, but filtering can be performed using a digital filter or low pass filter, and the signals are not restricted to a predetermined band.

Baseband units 116 and 186 are circuit blocks used to process the baseband signals before modulation or after demodulation. During transmission, baseband units 116 and 186 generate transmission baseband signals on the basis of the transmission data (bit sequence) inputted from applications 118 and 188 in a subsequent stage, and the signals are outputted to RF units 114 and 184. During reception, the received data (bit sequence) is restored on the basis of the received baseband signals demodulated by RF units 114 and 184, and the data is outputted to applications 118 and 188 in a subsequent stage.

More specifically, baseband units 116 and 186 include protocol stacks 120 and 190, transmitting circuit 122, digital-to-analog converter (DAC) 124 (124I and 124Q), receiving circuit 192, and analog-to-digital converter (ADC) 194 (194I and 194Q). Protocol stacks 120 and 190 are responsible for processing a hierarchical communication protocol group including a physical layer, data link layer, network layer, and transport layer. The controls performed by protocol stacks 120 and 190 include medium access controls (MAC) such as resend control when a bit or packet error occurs, transmission timing control, and delivery acknowledgment (ACK).

The transmitting circuit 122 modulates the transmission data inputted from the protocol stack 120 using the employed modulation scheme to generate transmission baseband data, and outputs this data as transmission baseband signals via the DAC 124 to the transmitting circuit 128 of the RF unit 114. The receiving circuit 192 acquires, via the ADC 194, received baseband signals demodulated by the receiving circuit 198 of the RF unit 184 as received baseband data, restores the received data in accordance with the modulation scheme, and outputs the data to the protocol stack 190.

There are no particular restrictions on the embodiment of the present invention explained here. For example, a quadrature amplitude modulation (QAM) scheme is used, and data transmitted by modulating the amplitudes and phases of two carriers. These two carriers, the common-phase (I-phase) carrier and quadrature-phase (Q-phase) carrier have a quadrature phase relationship to each other and are independent of each other.

In the embodiment of the present invention, the baseband signals (baseband data) have an I-phase and Q-phase component in accordance with the employed modulation scheme, and an I-phase DAC 124I, Q-phase DAC 124Q, I-phase ADC 194I and Q-phase ADC 194Q are provided in the I-phase and Q-phase transmission routes. The I-phase and Q-phase baseband signals indicate the signal points representing each symbol in a constellation diagram using the signal level, and constitute a symbol sequence in the transmission data.

The employed modulation scheme is negotiated in advance in the wireless communication system 100, and wireless communication devices 110 and 180 perform processing in accordance with a predetermined procedure. In the embodiment explained here, the preferred modulation scheme is a QAM scheme. However, there are no particular restrictions on the modulation scheme. Another modulation scheme can be used such as the M-ary phase-shift keying modulation scheme (MPSK).

These circuit blocks are typically connected to each other via alternating-current coupling 126 and 196 in accordance with differences such as bias settings in RF units 114 and 184 and baseband units 116 and 186. As mentioned above, when there is alternating-current coupling between circuit blocks, the signals require a direct-current balance. Therefore, in an embodiment of the present invention, pre-processing such as randomization using a scrambler is performed on the bits in the transmission data beforehand to eliminate the bit bias.

However, even when randomization has been performed using a scrambler, a bias occurs stochastically in the results of scrambling such as identical bits occurring successively in a predetermined period of time. A sequence of identical bits upsets the direct-current balance, direct-current offset components are generated, and the error rate deteriorates. When a modulation scheme is employed in which information is tuned in the amplitude direction, such as in QAM, the direct-current offset components have an effect on decisions made at the decision boundaries in the amplitude direction, and this effect cannot be ignored. The effect of direct-current offset components due to alternating-current coupling is especially significant at a high data rate. A different approach in which additional bits are inserted has been considered, such as 8b10b encoding, but this approach is undesirable because of reduced coding efficiency. Another approach has been considered in which the direct-current offset is corrected on the receiving end. However, this approach places an even greater burden on the receiver because the received data has to undergo additional signal correction.

In the wireless communication system 100, according to an embodiment of the present invention, the correction process is executed on the transmitting end, which changes the output waveform of the baseband signals in order to compensate for the direct-current offset observed on the receiving end. The following is a detailed explanation with reference to FIG. 3 through FIG. 8 of the correction process executed by the wireless communication device 110 on the transmitting end.

Figure 3:
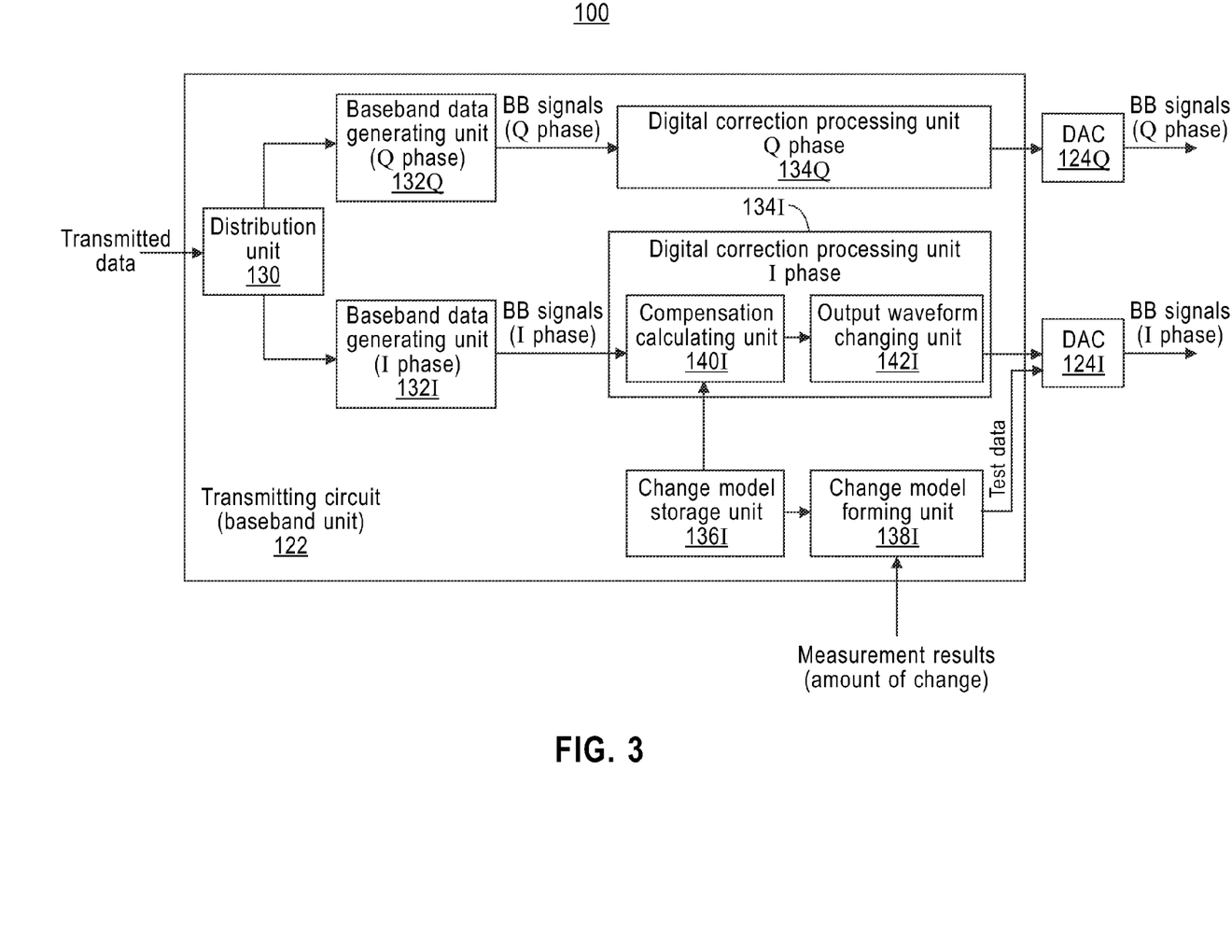
FIG. 3 is a detailed block diagram of the transmitting circuit in the baseband unit according to an embodiment of the present invention.

FIG. 3 is a detailed block diagram of the transmitting circuit 122 in the baseband unit 116 (FIG. 2) according to an embodiment of the present invention. The transmitting circuit 122 in the baseband unit 116 shown in FIG. 3 includes a distribution unit 130, I-phase and Q-phase baseband data generating units 132I and 132Q, and digital correction processing units 134I and 134Q. The distribution unit 130 receives transmission data (bit sequences) and distributes the data to the I-phase and Q-phase bit streams. The baseband data generating unit 132 generates baseband data of each phase in response to the bit stream to which the transmission data has been distributed by the distribution unit 130, and outputs the baseband data to the digital correction processing unit 134. The digital correction processing unit 134 corrects the baseband data of each phase on the receiving end while taking into account the effect of coupling observed on the receiving end. The baseband data which has been digitally corrected is inputted to the DAC 124, and output via the alternating-current coupling 126 as baseband data to the transmitting circuit 128 of the RF unit 114 in a subsequent stage.

FIG. 3 also shows the function blocks of the digital correction processing unit 134 and its periphery in greater detail. The detailed configuration of the Q-phase route has been omitted from FIG. 3, but the Q-phase route has the same configuration as the I-phase route.

The transmitting circuit 122 includes a change model storage unit 136 (1361) and a change model forming unit 138 (1381). The change model storage unit 136 stores the parameters for performing the correction process. More specifically, it stores the change model for the reference level (direct-current offset) of the baseband signals on the receiving end. The change model is modeled on changes to the reference level in the baseband signals observed on the receiving end that are due to capacitive coupling that is present between the wireless communication device 110 on the transmitting end and the wireless communication device 180 on the receiving end. The change due to this capacitive coupling can be characterized using a time constant. In the embodiment of the present invention explained here, the time constant of the capacitive coupling is obtained as the change model.

The capacitive coupling taken into account in the change model includes the alternating-current coupling 126 in the connection between the RF unit 114 and the baseband unit 116 on the receiving end shown in FIG. 2, as well as the alternating-current coupling 196 in the connection between the RF unit 184 and the baseband unit 186 on the receiving end, the mixers in the transmitting circuit 128 and receiving circuit 198 of RF units 114 and 184 on the transmitting and receiving ends, and other coupling circuits inserted into the transmission route. Therefore, each capacitive element intentionally or parasitically included in the entire transmission route between wireless communication devices 110 and 180. As a result, the change in the reference level observed on the receiving end can be compensated for properly, and the signal level can be determined appropriately.

The change model forming unit 138 forms a change model between the wireless communication devices on the transmitting and receiving ends, associates the model with wireless communication device 180, and stores the model in the change model storage unit 136. In a preferred embodiment, the change model forming unit 138 can exchange signals based on test data between wireless communication devices 110 and 180 during the calibration process prior to communication, and form the change model based on the measurement results.

More specifically, the change model forming unit 138 inputs rectangular test data to the DAC 124 during calibration, and rectangular baseband signals for testing purposes are inputted to the RF unit 114. The test signals are tuned to the carrier via the RF unit 114 and antenna 112, and transmitted to the wireless communication device 180 on the receiving end. The wireless communication device 180 on the receiving end receives the carrier signals, and measures the amount of change in the direct-current offset (reference level) of the test signals on the receiving end from the waveform observed in the received baseband signals.

Figure 4A:
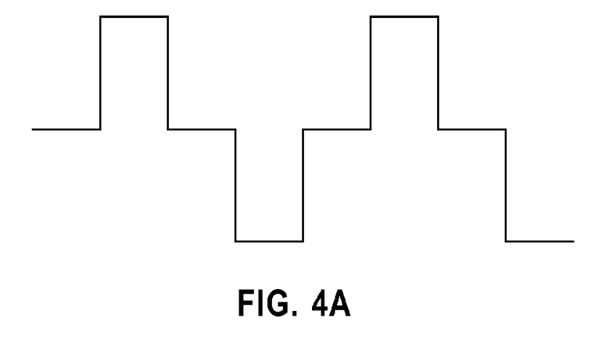
FIG. 4(A) shows an example of the waveform of the baseband signals transmitted by the wireless communication device on the transmitting end for testing purposes.
Figure 4B:
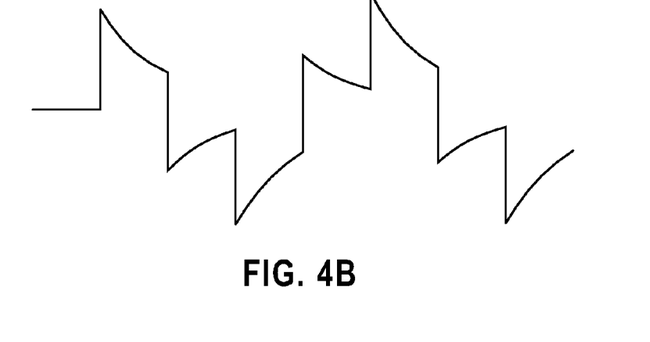
FIG. 4(B) shows the waveform of the baseband signals received by the wireless communication device on the receiving end when the test signals shown in FIG. 4 (A) are transmitted.
Figure 4C:
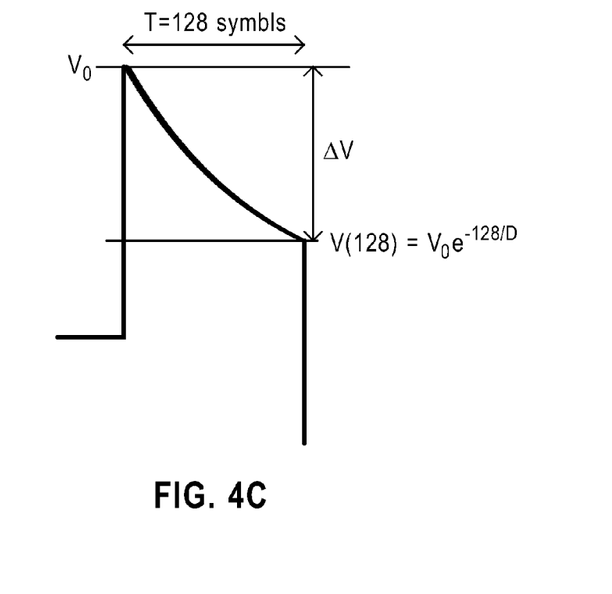
FIG. 4(C) shows the relationship between the amount of change observed by the wireless communication device on the receiving end and the time constant.

FIG. 4 is a diagram used to explain the change model forming process performed by the change model forming unit 138. FIG. 4 (A) shows an example of the waveform of the baseband signals transmitted by the wireless communication device 110 on the transmitting end for testing purposes. FIG. 4 (B) shows the waveform of the baseband signals received by the wireless communication device 180 on the receiving end when the test signals shown in FIG. 4 (A) are transmitted. FIG. 4 (C) is used to explain the relationship between the amount of change observed by the wireless communication device 180 on the receiving end and the time constant.

As shown in FIG. 4 (A), the test signals transmitted by the wireless communication device 110 on the transmitting end have a rectangular shape in which the signal level is shifted by a predetermined step (for example, 128 symbls). When carrier signals based on test signals with the waveform shown in FIG. 4 (A) are transmitted, the baseband signal waveform is observed on the receiving end in the distorted state shown in FIG. 4 (B) due to the capacitive coupling present in the transmission route.

The distortion in the waveform reflects the changes in the reference level (direct-current offset) that accompany the attenuation of the voltage level on an exponential curve in response to the time constant of the CR circuit which constitutes some of the capacitive coupling in the transmission route. When the step width T of the square waves of the test signals are known, the time constant D can be calculated using the amount of change Δ in the step from the starting point to the end point.

The amount of change observed by the wireless communication device 180 on the receiving end, which is used to determine the time constant, or the calculated time constant itself is transmitted by appropriate means to the wireless communication device 110 on the transmitting end as the measurement results. The measurement results observed by the wireless communication device 110 on the receiving end can simply be read by the user and entered into the wireless communication device 110 on the transmitting end. In a preferred embodiment, the measurement results can be transmitted to the wireless communication device 110 on the transmitting end via predetermined communication means in response to the reception of test signals by the wireless communication device 180 on the receiving end.

For example, when an association in charge of establishing high-speed wireless communication is connected via a wired connection, the measurement results can be transmitted via the wired connection. If a wireless communication link has already been established (a wireless communication link other than the millimeter-wave wireless link being used to establish communication), the measurement results can be transmitted via the wireless communication link. Alternatively, when the calibration process is performed once again, the measurement results can be transmitted via the previously established millimeter-wave communication link.

Figure 5:
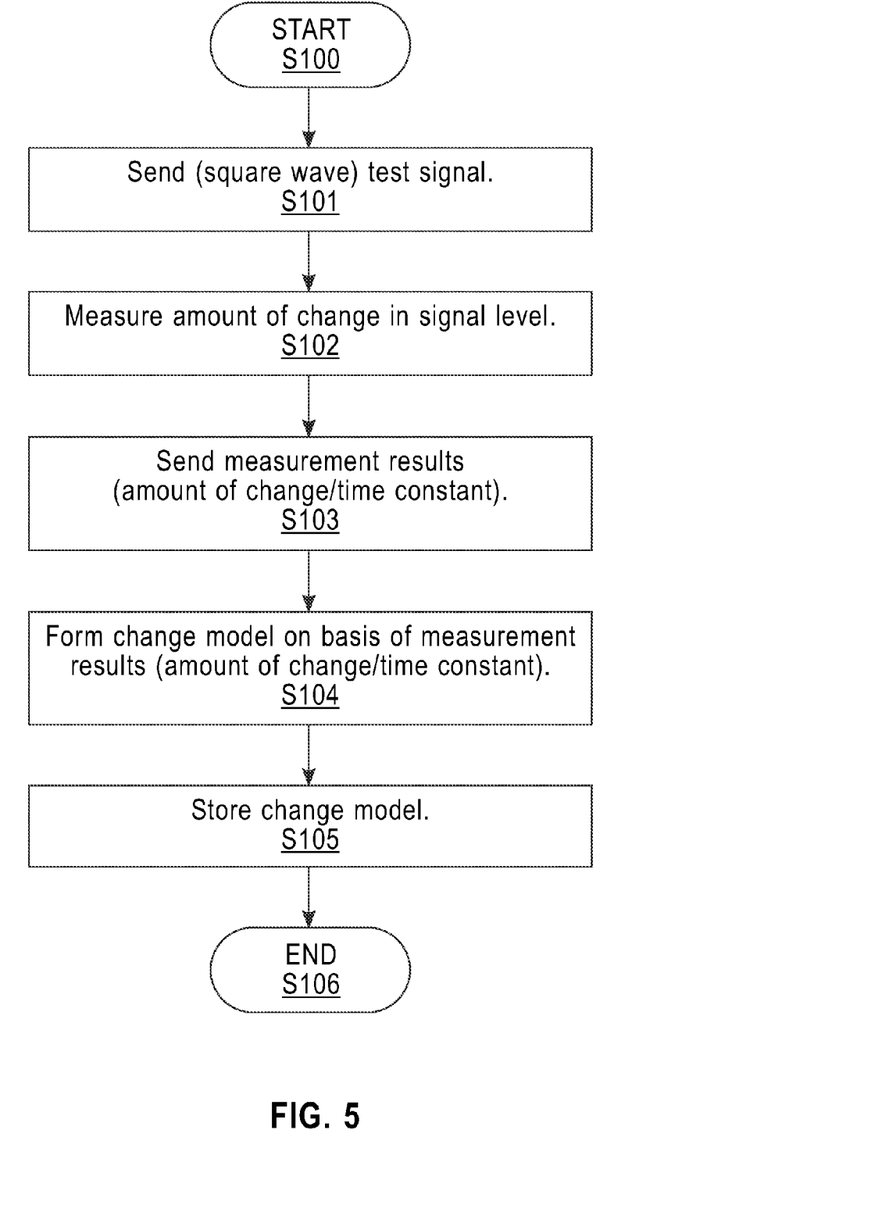
FIG. 5 is a flowchart showing a change model forming process performed by an embodiment of the present invention.

FIG. 5 is a flowchart showing the change model forming process performed by a preferred embodiment of the present invention. In the flowchart shown in FIG. 5, the processing performed by wireless communication device 110 is shown on the left and the processing performed by wireless transmission device 180 is shown on the right. The change model formation process shown in FIG. 5 starts from Step S100 in response to an instruction from the user to start the calibration processor or the startup of the device.

In Step S101, wireless communication device 110 outputs test data from the change model forming unit 138 via DAC 124 and RF circuit 114 to the wireless communication device 180 on the receiving end. In Step S102, the wireless communication device 180 on the receiving end measures the amount of change in the signal level for the waveform of the received test signals. In Step S103, measurement results including the measured amount of change is sent to the wireless communication device 110 on the transmitting end.

In Step S104, the change model forming unit 138 in the wireless communication device 110 forms a change model based on the amount of change in the measurement results. The change model can be obtained from a table in which parameters (time constants or the correction parameters described below) associated with various ranges in amount of change have been prepared, or can be calculated from the step width of the test signals or amount of change using an equation. In Step 105, the wireless communication device 110 stores the change model in the change model storage unit 136. In Step S106, the change model formation process is ended.

When the change model described above has been formed, the digital correction processing unit 134 can transmit and receive data while properly compensating for the direct-current offset. More specifically, as shown in FIG. 3, the digital correction processing unit 134 includes a compensation calculating unit 140 and an output waveform changing unit 142.

The compensation calculating unit 140 retrieves the change model from the change model storage unit 136, and calculates the compensation value needed to offset the change in the direct-current offset on the basis of the retrieved change model. The bias (data values) of the signal level is accumulated on the basis of baseband signals constituting a symbol sequence, and a compensation value is calculated at each point in time for the signals in response to the cumulative bias.

The output waveform changing unit 142 intentionally changes the output waveform of the baseband signals in response to the compensation values for the direct-current offset. The change in the output waveform of the baseband signals can be performed by shifting the output voltage up or down at each point in time of the original baseband signals on the basis of the compensation values at each point in time for the baseband signals so the change in the direct-current offset on the receiving end is offset and an ideal signal waveform is obtained on the receiving end. In the present invention, the output voltage is changed by adding a compensation value to the value of the baseband data in the digital data stage prior to DAC 124. However, in embodiments of the present invention, the level of the baseband signal can be adjusted up or down by the amount of the compensation value in the analog signal stage after DAC 124.

Figure 6:
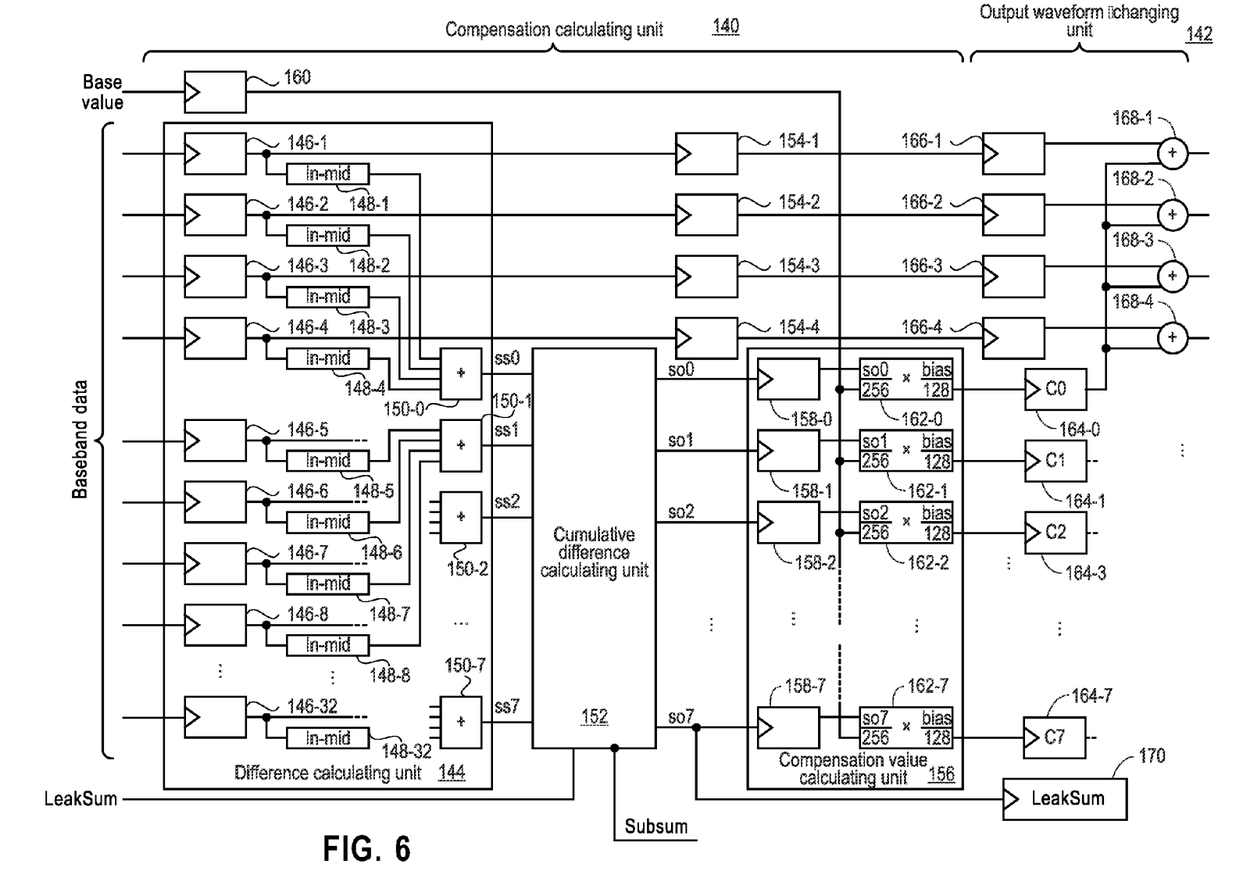
FIG. 6 is a block diagram showing the circuit configuration of the compensation calculating unit and the output waveform changing unit according to embodiments of the present invention.

FIG. 6 is a block diagram showing the circuit configuration of the compensation calculating unit 140 and the output waveform changing unit 142. The compensation calculating unit 140 includes a difference calculating unit 144, a cumulative difference calculating device 152, and a compensation value calculating unit 156.

The difference calculating unit 144 calculates the difference between the corresponding data value and value (central value) corresponding to the reference level in the inputted baseband data at each sampling point (the symbol (signal point) being indicated by the value of the I-phase or Q-phase sampling point). The cumulative difference calculating device 152 calculates the cumulative value of the difference from a predetermined reference point to each sampling point. Here, the reference point can be the start point of the transmission frame. In this case, the cumulative value for the difference is reset for each frame.

The compensation value calculating unit 156 multiplies the cumulative difference value in the baseband data to each sampling point by the corresponding bias value in the change model to obtain a compensation value for compensating for the change in the direct-current offset at the point in time corresponding to each sampling point. Here, the bias value is a correction parameter corresponding to the degree of change indicated by the observed change model (time constant).

The output waveform changing unit 142 includes an adder 168 for adding the calculated compensation value to the data value corresponding to each sampling point in the baseband data. In the embodiment explained here, the output waveform of the baseband signals is changed by adding the compensation value obtained for each sampling point to the data value corresponding to each sampling point in the original baseband data, and inputting the resulting value to the DAC 124 to change the value to a voltage signal.

More specifically, in the embodiment of the present invention explained here, as shown in FIG. 6, the baseband data is parallelized for each of a predetermined number of samples (32 symbols in FIG. 6), and the DAC value for each symbol (for example, an 8-bit value) is inputted to the difference calculating unit 144. In the difference calculating unit 144, the cumulative difference calculating unit 152 and the compensation value calculating unit 156, parallel calculation of the difference value, cumulative difference value and compensation value is performed for each of a predetermined number of samples (four symbols in FIG. 6, referred to as the "calculation unit" below).

More specifically, the difference calculating unit 144 includes latch registers 146-1 through 146-32, difference calculating devices 148-1 through 148-32, and difference total calculating devices 150-0 through 150-7. The number of latch registers and difference calculating devices corresponds to a predetermined number of samples (32 symbols in FIG. 6) holding each DAC value in the inputted baseband data. The difference calculating devices 148-1 through 148-32 calculate, respectively, the difference between the DAC value held by latch registers 146-1 through 146-32 and the reference value mid of the signal (central value "128" can be used if the DAC value is 8 bits). The difference calculating devices 150 receive the difference values from the difference calculating device belonging to their own calculation unit, and calculating the difference total for each calculation unit. In the example shown in FIG. 6, there are eight (=32 samples/4 samples) difference total calculating devices 150-0 through 150-7 serving as the difference total calculating devices 150.

The difference total calculating devices 150-0 through 150-7 output difference total values ss0 through ss7, respectively, to the cumulative difference calculating unit 152. The cumulative difference calculating unit 152 calculates the sum of the difference total values (ss0 through ss7) for each calculation unit, and calculates the cumulative difference value from the predetermined reference point to each calculation unit. The cumulative difference value is the value indicating the cumulative bias of the signal level from the predetermined reference point. In the example shown in FIG. 6, this is calculated using the following equations. In the equations, ss* denotes the difference total value of the *th calculation unit (where * is 0 through 7 in FIG. 6), and so* denotes the cumulative difference value of the *th calculation unit.

$$so0 = LeakSum + ss0$$  Equation 1
$$so1 = LeakSum + ss0 + ss1$$
$$so2 = LeakSum + ss0 + ss1 + ss2$$
$$\vdots$$
$$so7 = LeakSum + ss0 + \ldots + ss7$$

The cumulative difference value so7 of the final calculation unit is inputted to latch register 170, and passed on as the LeakSum for the calculations in the next clock cycle. The cumulative difference values so0 through so7 for each calculation unit are inputted to latch registers 158-0 through 158-7.

The compensation value calculating unit 156 includes multipliers 162-0 through 162-7 for the calculation units. Multipliers 162-0 through 162-7 receive, respectively, the cumulative total values so0 through so7 held by latch registers 158-0 through 158-7, and a bias value 160 provided in response to the time constant. Multipliers 162-0 through 162-7 multiply, respectively, the cumulative difference value so0 through so7 for its own calculation unit by the bias value to calculate the compensation values c0 through c8 for each calculation unit. Calculated compensation values c0 through c7 are inputted to latch registers 164-0 through 164-7.

The DAC values held by latch registers 146-1-164-32 are inputted, successively, to latch registers 154-1 through 154-32, and latch registers 166-1 through 166-32. Adders 168-1 through 168-32 are included in a stage subsequent to latch registers 166-1 through 166-32. Adders 168-1 through 168-32 receive the DAC values held by latch registers 166-1 through 166-32, and the compensation values c0 through c7 held by the latch registers 164-0 through 164-7 of their own calculation unit. Adders 168-1 through 168-32 add each compensation value c0 through c7 to the DAC value of the original baseband data for each calculation unit, and output the resulting values.

In the example shown in FIG. 6, compensation values are calculated for calculation units with four samples, and added to calculation units with four samples. However, there are no particular restrictions on the number of calculating and adding units for the compensation values. When the number of calculation units is increased, the scale of the required circuits is smaller and this results in power savings. However, when the number of calculation units is small, the correction tends to be more accurate. Therefore, the number of calculation units can be determined based on an acceptable circuit scale and the required correction accuracy. In another embodiment of the present invention, the number of calculation units for calculating the compensation values and adding the compensation values can be different. For example, compensation values calculated for four-sample calculation units (for example, adjacent calculation units) can be weight-averaged based on their position inside the calculation unit to calculate a compensation value for each sample.

Figure 7:
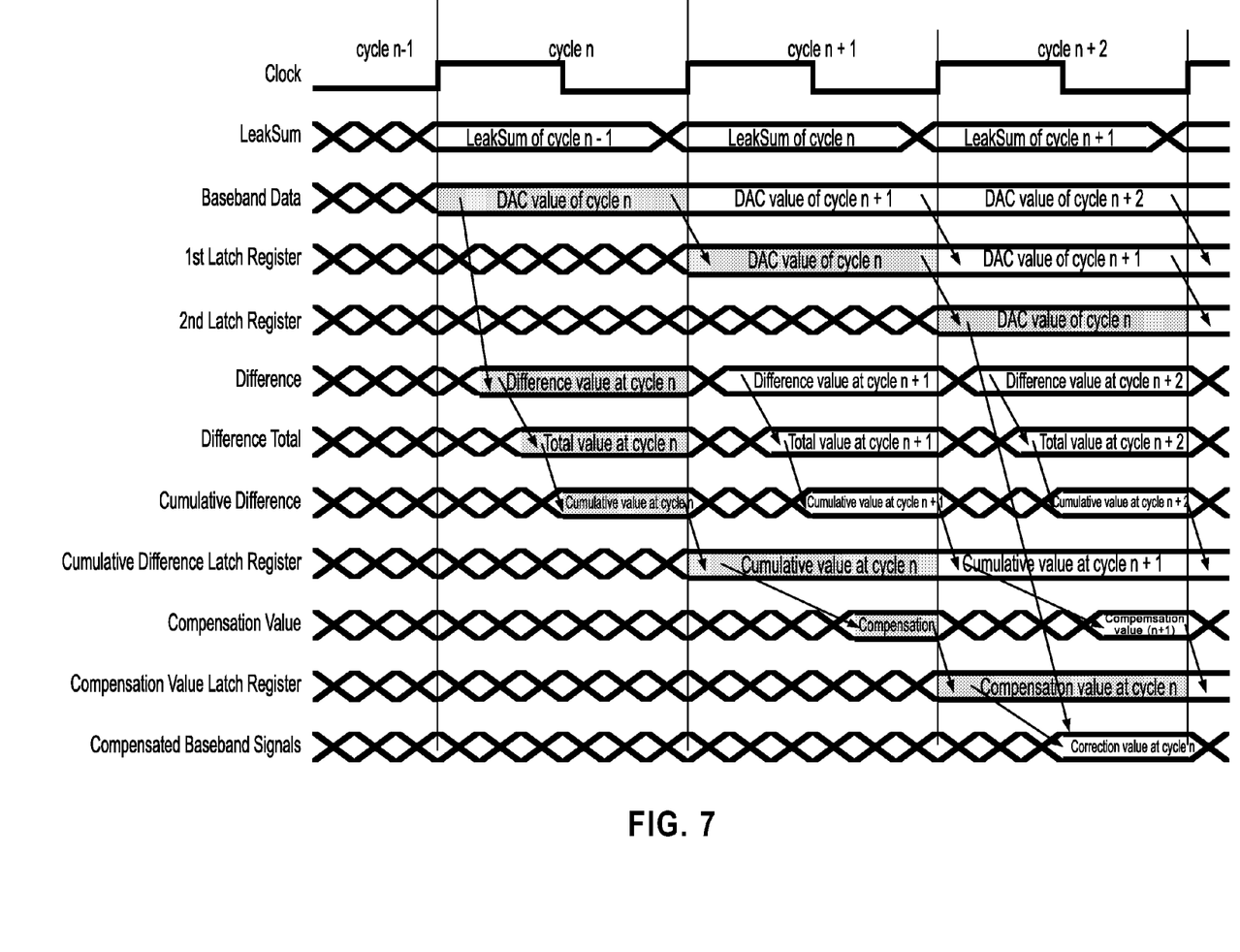
FIG. 7 is the timing chart for the circuit configuration shown in FIG. 6 according to embodiments of the present invention.
Figure 8A:
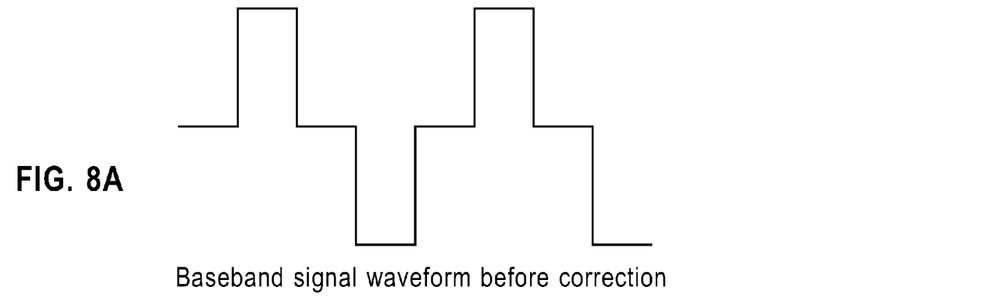
FIG. 8(A) shows an example of the waveform of the baseband signals before correction to be transmitted by the wireless communication device on the transmitting end.
Figure 8B:
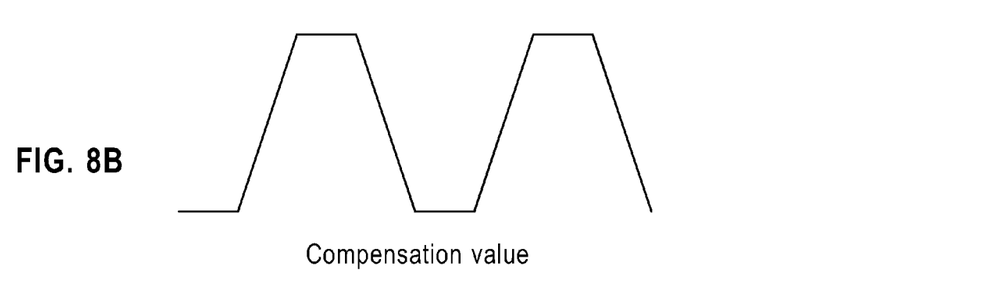
FIG. 8(B) shows an example of a time series for the compensation values calculated for the baseband signals shown in FIG. 8 (A)
Figure 8C:
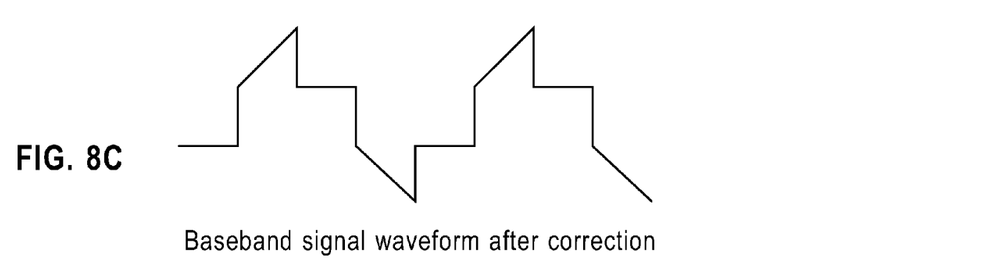
FIG. 8(C) shows an example of the waveform of the baseband signals after correction in which the waveform has been changed on the basis of the time series for the compensation values.
Figure 8D:
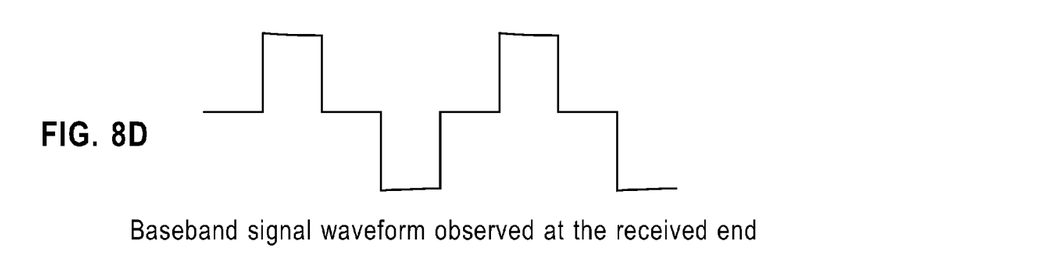
FIG. 8(D) is a schematic diagram of the received baseband signal waveform as observed by the wireless communication device on the receiving end which has received the baseband signals after correction.

FIG. 7 is the timing chart for the circuit configuration of the compensation calculating unit 140 and the output waveform changing unit 142 shown in FIG. 6. In the timing chart shown in FIG. 7, the DAC value (n) for 32 symbols in the baseband data is held in latch register 146 at the edge of the nth clock cycle. The LeakSum (n−1) calculated in the previous clock cycle (n−1) is held in latch register 170. In the nth clock cycle, the difference between the DAC value (n) and the reference value is calculated in parallel for each symbol by the difference calculating device 148, the difference total for each calculation unit is calculated in parallel by the different total calculating device 150, and the cumulative value of the differences in each calculation unit are calculated in parallel by the cumulative difference calculating unit 152.

Next, in the n+1th clock cycle, the DAC value (n) held by latch register 146 in the nth clock cycle is set in the first stage latch register 154, and DAC value (n+1) is set anew in latch register 146. Here, the difference, total difference and cumulative difference are calculated with respect to DAC value (n+1). In addition, the cumulative difference value (n) for each calculation unit calculated in the previous clock cycle (n) is set in latch register 158, and the cumulative difference value for each calculation unit and the bias value are multiplied by the compensation value calculating unit 156 to calculate the compensation value (n) of each calculation unit for the DAC value (n) of the previous clock cycle.

In the n+2th clock cycle, the DAC value (n) held in the first-stage latch register 154 in clock cycle (n+1) is set in the second-stage latch register 166, the difference, difference total and cumulative difference are calculated in clock cycle (n+2), and the compensation value (n+1) is calculated for the DAC value (n+1). At the same time, the compensation value (n) for each calculation unit calculated in the previous cycle is set in the latch register 164, and the adder 168 adds the DAC value (n) and the compensation value (n). In this way, corrected baseband data for 32 symbols is generated. The digitally corrected baseband data is inputted to DAC 124, outputted to the transmitting circuit 128 of the RF unit 114 in a subsequent stage as the baseband data, and transmitted to the wireless communication device 180 on the receiving end.

FIG. 8 is a diagram used to explain, along with the signal waveform, a correction process based on changes to the output waveform of the baseband signals on the transmitting end. FIG. 8 (A) shows an example of the waveform of the baseband signals before correction to be transmitted by the wireless communication device 110 on the transmitting end. FIG. 8 (B) shows an example of a time series for the compensation values calculated for the baseband signals shown in FIG. 8 (A). FIG. 8 (C) shows an example of the waveform of the baseband signals after correction in which the waveform has been changed on the basis of the time series for the compensation values. FIG. 8 (D) is a schematic diagram of the received baseband signal waveform as observed by the wireless communication device 180 on the receiving end which has received the baseband signals after correction.

As shown in FIG. 4 (A) and FIG. 4 (B), when signals with the waveform shown in FIG. 4 (A) are transmitted from the wireless communication device 110 on the transmitting end, the signal waveform observed on the receiving end is distorted due to capacitive coupling in the transmission route. In contrast, the wireless communication device 110 of the present invention adds the compensation values shown in FIG. 8 (B) to the original baseband signals prior to correction, and outputs signals with the distorted outside shape shown in FIG. 8 (C). However, when baseband signals with the waveform shown in FIG. 8 (C) are transmitted to the receiving end, the waveform observed on the receiving end resembles the ideal waveform prior to correction as shown in FIG. 8 (D) due to coupling in the transmission route.

The boundary determination is made properly on the receiving end without having to perform any special correction processing on the reference level because the received baseband signals have a normal waveform. Therefore, the coupling effect can be compensated for, and the data transmitted from the transmitting end can be quickly restored. In the circuit configuration shown in FIG. 6, the compensation value is calculated in three cycles. However, communication can be pipelined and communication performed at a data rate of several gigabytes using a millimeter-wave communication technique.

According to an exemplary embodiment of the present invention, the digital compensation circuit shown in FIG. 6 can constitute a millimeter-wave communication device mounted on FPGA (Virtex-5LX330) manufactured by Xilinx, Inc. The carrier was 60 GHz electromagnetic waves, and the modulation scheme was 16QAM. The alternating-current coupling between the RF unit and baseband unit of the millimeter-wave wireless communication device was approximately 6 nF. The mounted millimeter-wave wireless communication device was used to perform millimeter-wave communication on the basis of square-wave baseband signals which have been corrected, and the demodulated baseband signals were observed on the receiving end. For the sake of comparison, the mounted millimeter-wave communication device was used to perform millimeter-wave communication using the same baseband signals but without correction, and the demodulated baseband signals were observed on the receiving end.

Figure 9A:
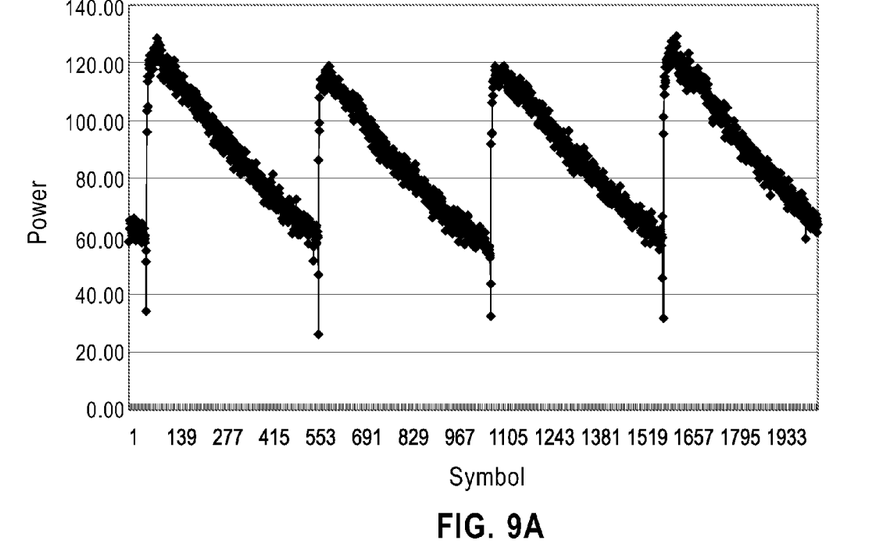
FIG. 9(A) shows the measured waveform of the baseband signals observed on the receiving when transmitted by the millimeter-wave communication device prior to correction as shown in FIG. 8 (A)
Figure 9B:
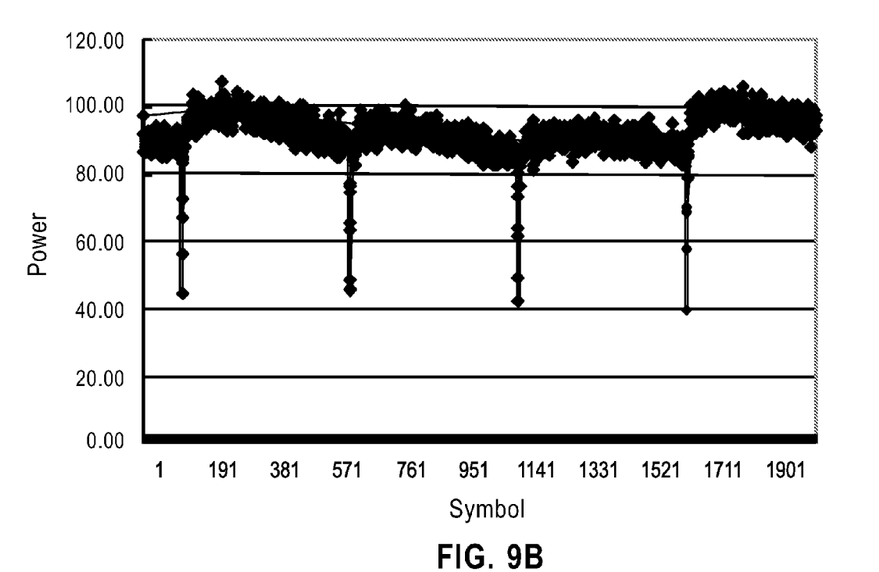
FIG. 9(B) shows the measured waveform of the baseband signals observed on the receiving when transmitted by the millimeter-wave communication device after digital correction.

FIG. 9 (A) shows the measured waveform of the baseband signals observed on the receiving when transmitted by the millimeter-wave communication device prior to correction as shown in FIG. 8 (A). FIG. 9 (B) shows the measured waveform of the baseband signals observed on the receiving when transmitted by the millimeter-wave communication device after digital correction It is clear from FIG. 9 (A) that the DC balance is upset when the correction processing in the present embodiment is not performed. In the actual measured data shown in FIG. 9 (A), the approximate initial power (root-mean-square value) of 120 in each step has been attenuated about 50% to approximately 60 at the end of the step. When digital correction is performed by the mounted circuit shown in FIG. 6, the signal level is nearly flat as shown in FIG. 9 (B), which clearly marks an improvement in the signal level fluctuation. According to calculations, the amount of attenuation to the signal power was reduced to approximately 10%. Clearly, high-speed wireless communication of 7 Gbit per seconds can be realized between millimeter-wave communication devices including this digital correction circuit.

As explained above, the present embodiment is able to provide a transmitting device, a receiving device, a circuit device, a communication method executed by the transmitting device and the receiving device, and a computer program product able to realize the transmitting device which are capable of rapidly compensating for any change in the reference level due to coupling which is observed at the receiving device end.

A high-speed data rate requires a capacitor with good frequency characteristics on the high-frequency end. A capacitive element with a large capacity is also desired to suppress the change in the reference level due to the coupling described above. However, when the capacity of the capacitor is increased, the frequency characteristics tend to deteriorate, and this poses significant design constraints on increasing the data rate.

However, the configuration described above is able to properly compensate for changes in the reference level which are unavoidable at high data rates, and can be readily applied to high-speed communication using millimeter-wave communication.

Assuming millimeter-wave wireless communication has a high data rate, the overheat is relatively high when the correction is performed by the receiving device, and it is difficult to realize sufficient direct-current offset correction using signal correction processing on the receiving end. Because the receiving device also has to perform signal correction on received data, it would be desirable to reduce the burden on the receiving device as much as possible.

In the configuration described above, the signal output waveform is changed by the communication device on the transmitting end to compensate for changes in the reference level observed on the receiving end. In this way, signals in which the changes in the reference level have been sufficiently reduced can be observed, and determination of the correct bit values performed on the receiving end without performing special correction processing related to changes in the reference level. Therefore, the burden is offloaded onto the transmitting end, which is advantageous in communication at a high data rate. Also, because the transmitting end can determine which data has been sent on its own, the process is more efficient than when the configuration used to correct signals is installed on the receiving end.

Some or all of the functional components can be installed in a programmable device (PD) such as a field-programmable gate array (FPGA) or integrated into an application-specific integrated circuit (ASIC). In order to realize the functional components in a PD, the circuit configuration data (bit stream data) for download to the PD, and data written in hardware description language (HDL), very high-speed integrated circuit hardware description language (VHDL) or Verilog-HDL for generating the circuit configuration data can be distributed via a storage medium.

The present invention was explained with reference to an embodiment. However, the present invention is not limited to the embodiment explained above. The present invention can be altered in any way conceivable by a person of skill in the art, including other embodiments, additions, modifications, and deletions. Any aspect realizing the actions and effects of the present invention is within the scope of the present invention.

What is claimed is:

1. A transmitting device capable of communicating with a receiving device, the transmitting device comprising:

a model storage unit for storing a change model for a reference level of a signal on a receiving device end due to coupling between a transmitting device and the receiving device;

a compensation calculating unit for calculating a compensation value for offsetting a change in the reference level of the signal constituting a symbol sequence on the receiving device end; and an output waveform changing unit for changing an output waveform of the signal constituting the symbol sequence on a basis of the compensation value of the change in the reference level;

wherein the compensation calculating unit accumulates a signal bias on a basis of the signal constituting the symbol sequence and calculates the compensation value for the signal at each point in the time in response to a cumulative bias; and wherein the output waveform changing unit changes an output voltage of the signal at each point in time on the basis of the compensation value at each point in time for the signal constituting the symbol sequence.

2. The transmitting device according to claim 1, further comprising:

a transmitting unit for tuning a test signal having a square shape with carriers and transmitting the test signal to the receiving device; and a model forming unit for forming a change model including a time constant for capacitive coupling present between the transmitting device and the receiving device on a basis of an amount of change in a signal level of the test signal observed at the receiving device end.

3. The transmitting device according to claim 2, wherein the compensation calculating unit comprises:

a difference calculating unit for calculating a difference between a value of an inputted signal constituting the symbol sequence at each sampling point and a value corresponding to the reference level of the inputted signal;

a cumulative difference calculating device for calculating a cumulative value for a difference in the inputted signal at each sampling point from a predetermined reference time point; and a compensation value calculating unit for multiplying the cumulative value of the difference in the inputted signal at each sampling point by a bias value corresponding to a time constant, and calculating a compensation value at each point in time corresponding to each sampling point.

4. The transmitting device according to claim 3, wherein the output waveform changing unit includes an adding unit for adding the compensation value to the value of the inputted signal constituting the symbol sequence corresponding to each sampling point.

5. The transmitting device according to claim 4, wherein the difference calculating unit calculates in parallel a total of the difference for each unit including a plurality of sampling points; the cumulative calculating device calculates in parallel a cumulative value for each unit including the plurality of sampling points; and the compensation value calculating unit calculates in parallel the compensation value for each unit including the plurality of sampling points.

6. The transmitting device according to claim 5, wherein the transmitting device includes at least one clock cycle for a performance of a calculation by the difference calculating unit, a calculation by the cumulative difference calculating device, and a calculation by the compensation value calculating unit; and a clock cycle subsequent to the at least one clock cycle for a performance of addition by a adding unit.

7. The transmitting device according to claim 1, wherein the change in the reference level due to coupling includes a direct-current offset component due to a bias in the values of the symbol sequence as the signal constituting the symbol sequence passes through a coupling element present between the transmitting device and the receiving device.

8. A non-transitory computer program product comprising a computer readable storage medium having program instructions embodied therewith, wherein the program instructions are executable by a device, wherein the program instructions cause the device to function as each of the components of the transmitting device according to claim 1.

9. A circuit device for generating a signal to output to a subsequent stage via a coupling element, the circuit device comprising:

a model storage unit for storing a change model for a reference level of a signal due at least to coupling by a coupling element;

a calculating unit for calculating a compensation value for offsetting a change in the reference level of a signal having a plurality of signal levels on the basis of the change model; and an output waveform changing unit for changing the output waveform to a subsequent stage of the signal having the plurality of signal levels on the basis of the compensation value for the change in the reference level;

wherein the calculating unit accumulates a signal bias on a basis of the signal having a plurality of signal levels and calculates the compensation value for the signal at each point in time in response to a cumulative bias; and wherein the output waveform changing unit changes an output voltage of the signal at each point in time on the basis of the compensation value at each point in time for the signal having a plurality of signal levels.

10. A communication method executed by a receiving device and a transmitting device capable of communicating with the receiving device, the communication method comprising:

reading, using a transmitting device, a change model for a reference level of a signal at a receiving device end due to coupling present between the transmitting device and the receiving device; and transmitting by the transmitting device a signal constituting a symbol sequence to the receiving device;

wherein, transmitting the signal further includes:

calculating, on a basis of the change model, a compensation value for the signal constituting the symbol sequence to offset a change in the reference level at the receiving device end; and changing, on the basis of the compensation value for the change in the reference level, an output waveform of the signal constituting the symbol sequence wherein the step of calculating the compensation value includes the transmitting device accumulating a signal basis of the signal constituting the symbol sequence and calculating a compensation value for the signal at each point in time in response to a cumulative bias; and wherein the step of changing the output waveform includes the step of the transmitting device changing an output voltage of the signal at each point in time on the basis of the compensation value at each point in time for the signal ontituting the symbol sequence.

11. The communication method according to claim 10, further comprising:

tuning, using the transmitting device, a test signal having a square shape with carriers;

transmitting the test signal to the receiving device;

responding, using the receiving device, a measurement result of the change in the test signal; and forming by the transmitting device a change model including a time constant for capacitive coupling present between the transmitting device and the receiving device on a basis of an amount of change in a signal level of the test signal observed at the receiving device end.

12. The communication method according to claim 10, wherein, the step of calculating the compensation value further comprises:

the transmitting device, calculating the difference between the value of an inputted signal constituting the symbol sequence at each sampling point and a value corresponding to the reference level of the inputted signal;

calculating a cumulative value for a difference in the inputted signal at each sampling point from a predetermined reference time point;

multiplying the cumulative value of the difference in the inputted signal at each sampling point by a bias value corresponding to a time constant; and calculating a compensation value at the point in time corresponding to each sampling point; and wherein, the step of changing the output waveform includes adding the compensation value to the value of the inputted signal constituting the symbol sequence corresponding to each sampling point.

13. The communication method according to claim 12, wherein, calculating the difference, calculating the cumulative value of the difference, and calculating the compensation value are executed in at least one clock cycle; and wherein, adding the compensation value is executed in a clock cycle subsequent to the at least one clock cycle.

14. A communication method executed by a receiving device and a transmitting device capable of communicating with the receiving device, the communication method comprising:

reading, using a transmitting device, a change model for a reference level of a signal at a receiving device end due to coupling present between the transmitting device and the receiving device; and transmitting by the transmitting device a signal constituting a symbol sequence to the receiving device;

wherein, transmitting the signal further includes:

calculating, on a basis of the change model, a compensation value for the signal constituting the symbol sequence to offset a change in the reference level at the receiving device end; and changing, on the basis of the compensation value for the change in the reference level, an output waveform of the signal constituting the symbol sequence wherein, the step of calculating the compensation value further comprises:

the transmitting device, calculating the difference between the value of an inputted signal constituting the symbol sequence at each sampling point and a value corresponding to the reference level of the inputted signal;

calculating a cumulative value for a difference in the inputted signal at each sampling point from a predetermined reference time point;

multiplying the cumulative value of the difference in the inputted signal at each sampling point by a bias value corresponding to a time constant; and calculating a compensation value at the point in time corresponding to each sampling point; and wherein, the step of changing the output waveform includes adding the compensation value to the value of the inputted signal constituting the symbol sequence corresponding to each sampling point.

15. The communication method according to claim 1, wherein, calculating the difference, calculating the cumulative value of the difference, and calculating the compensation value are executed in at least one clock cycle; and wherein, adding the compensation value is executed in a clock cycle subsequent to the at least one clock cycle.

* * * * *